Feb. 24, 1953 R. E. MORNINGSTAR ET AL 2,629,133
PRODUCTION OF NONCAKING FINELY GROUND SULFUR
Filed June 6, 1950
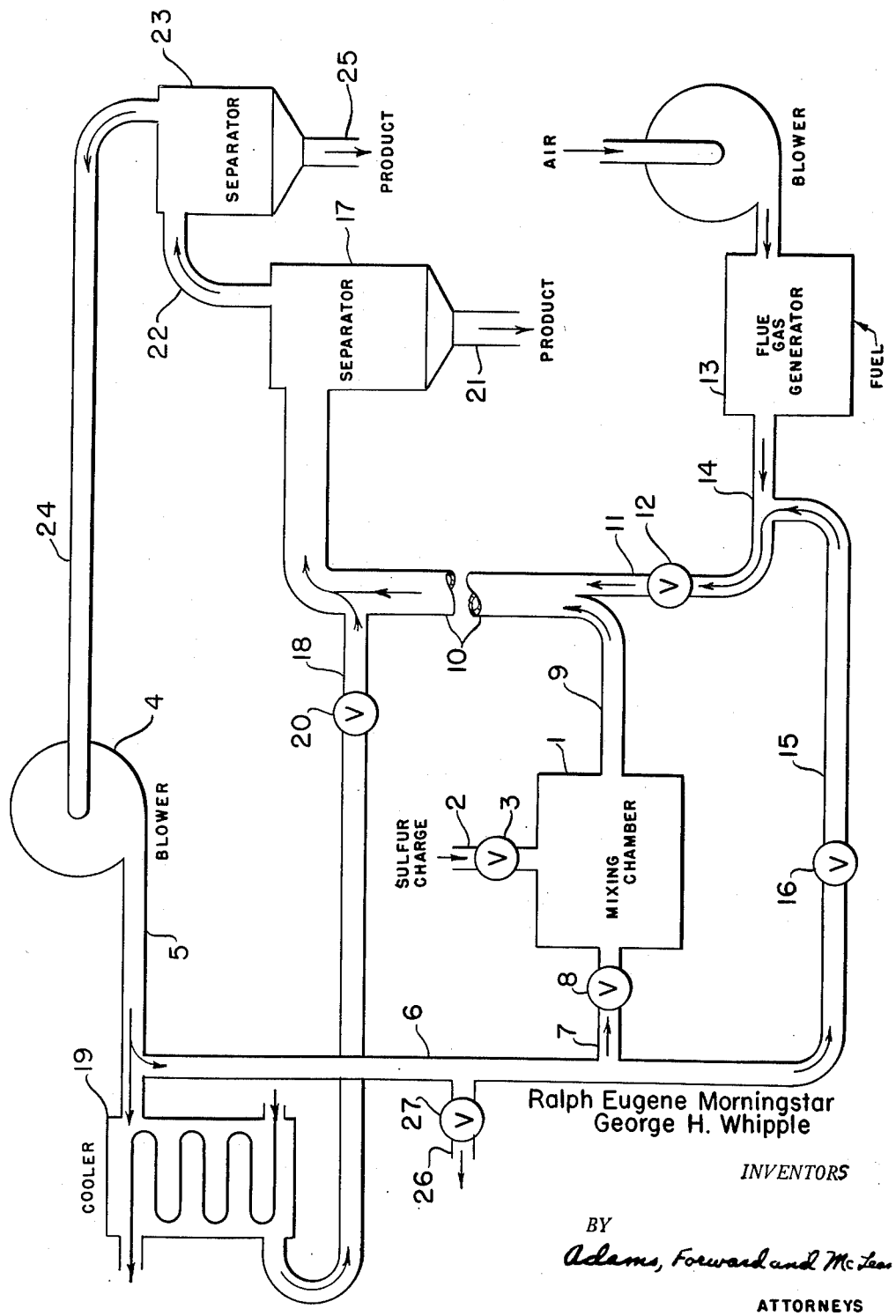
Ralph Eugene Morningstar
George H. Whipple
INVENTORS
BY
Adams, Forward and McLean
ATTORNEYS Patented Feb. 24, 1953

2,629,133

UNITED STATES PATENT OFFICE 2,629,133

PRODUCTION OF NONCAKING FINELY GROUND SULFUR

Ralph Eugene Morningstar, Columbus, Ohio, and George H. Whipple, Wilmington, Del., assignors to Mathieson Chemical Corporation, a corporation of Virginia Application June 6, 1950, Serial No. 166,372

4 Claims. (Cl. 18—47.3)

Our invention relates to the treatment of finely ground sulfur and particularly to an improved process for the continuous production of a noncaking finely ground sulfur.

Sulfur when in a finely ground form has a decided tendency to cake on storage. The caking will occur in time with exposure in an open vessel but is much more rapid and severe when the sulfur is subjected to pressure as in warehouse storage, where it may be stacked in bags to heights of 5 to 10 feet. The formation of hard lumps in the finely ground sulfur makes it difficult to blend the sulfur with other agents, as in mixed insecticides, and renders application, for example, dispersion with dusting apparatus, more difficult.

In order to overcome this caking tendency of finely ground sulfur, it has been the practice to add various conditioning materials to the ground sulfur and to depend upon whatever natural inhibitors may be present. The concentration of conditioners used to prevent caking depends on the nature of the crude sulfur, the conditioning material and the quality and purity desired in the final product. In general the quantity of the inert conditioner used ranges from 2 to 10 per cent of the total mixture. Such conditioned sulfurs, therefore, contain only 90 to 98 per cent sulfur and obviously are less desirable from an economic standpoint than pure sulfur. In addition, the presence of conditioning materials and natural organic inhibitors has the obvious disadvantage that the sulfur product is of limited purity, which must be taken into account when the sulfur is used. Any deleterious effects of the conditioner or the contaminating inhibitors in use have to be counteracted or may even preclude the use of such sulfur.

We have discovered that it is possible to produce a non-caking finely ground sulfur by heating the crude, ground sulfur to an elevated temperature, e. g., 95° to 105° C. but below the melting point, and holding the sulfur at this temperature for a period of time sufficient to effect the conversion from a caking to a non-caking product, e. g., ½-hour to several hours or more. The general process and a particularly advantageous procedure are described and claimed in our co-pending applications, Ser. No. 142,097, filed February 2, 1950, and Ser. No. 150,128, filed March 17, 1950. Finely ground sulfur produced according to these processes or in accordance with our present process is not limited in purity by any dependence on natural contaminants which may serve as caking inhibitors and is non-caking without the introduction of any inert conditioner materials.

We have now discovered that non-caking sulfur can be produced by heat treating under particular conditions which afford a substantial reduction in treating time. We have found that the finely ground sulfur can be successfully and rapidly treated by suspending it in a stream of inert gas heated to an elevated temperature of the order of the melting point of the sulfur. With advantage, the temperature exceeds the melting point, e. g., 110°–115° C., but should be maintained below about 135° C. Under conditions effecting particle melting or incipient melting, conversion from caking form to non-caking form is substantially instantaneous. The identity of individual particles is maintained by the suspension in the flowing stream and no substantial agglomeration occurs even at temperatures above the melting point. When the desired conversion is accomplished, the hot sulfur suspended in the gas stream is cooled to a temperature at least below the melting point of the sulfur before the sulfur particles are separated from the gas stream.

The process of our present invention has the advantage that no pre-heating or prolonged holding time at treating temperature is necessary. The sulfur reaches the treating temperature of the gas stream almost immediately because of the small particle size and the exposure of each individual particle to the hot gas stream. Therefore, the extended heating time required when sulfur is heated in bulk and even the lesser times required when small increments of the sulfur are heated is obviated by the present process.

Our process has the further advantage that substantially no agglomeration of the sulfur particles occurs when the suspension is properly cooled prior to the separation of sulfur particles from the gas stream, so that it is unnecessary to subject the treated sulfur to size classification to reduce agglomerates.

Any gas substantially inert to sulfur is suitable as a suspending and carrying medium. For example, nitrogen or flue gas may be used. Steam may also be used, but there must be a sufficient quantity of other inert gas present during the cooling operation to maintain the resultant mixture above the dew point.

In accordance with the process of our present invention, finely ground sulfur, usually finer than 325 mesh, is introduced into an elongated chamber with a stream of inert gas. The velocity of the inert gas stream must be at least sufficient to suspend the finely ground sulfur particles. The initial gas stream may be at an elevated temperature sufficient to effect the desired conversion or may be at a lower initial temperature, in which case the suspended stream is brought to treating temperature by introducing an additional quantity of gas at elevated temperature. The final temperature of the gas stream should be about 115° C. or higher. The upper limit of temperature is theoretically the vaporizing temperature of sulfur, but practically, it is advantageous to maintain the temperature of the gas stream and suspended sulfur below about 135° C. Higher temperatures may be employed, but are unnecessary to produce the result desired.

The finely ground sulfur is maintained in stream flow at the treating temperature for a sufficient period of time to effect the desired conversion. At temperatures approximating the melting point of the sulfur, i. e., temperatures of 110°–115° C. or slightly higher, the required retention time is short, for conversion to non-caking particles is rapid, e. g., about a minute or less. At the higher temperatures effecting melting, the required retention time is further reduced, for conversion is substantially instantaneous, e. g., several seconds.

When the sulfur suspended in the gas stream has been maintained at the treating temperature for at least the minimum required retention time, the temperature of the stream of gas and the suspended sulfur particles is reduced to a point at least below the melting point of the sulfur before a separation of the sulfur particles and the gas stream is effected. Because the sulfur tends to form a firm cake if permitted to stand at temperatures in excess of about 46° C., particularly under pressure, it is advantageous to cool the flowing stream of sulfur particles and inert gas to a temperature below about 46° C. before the separation of sulfur from the gas stream is performed.

The cooling of the flowing stream of inert gas and suspended sulfur particles can be accomplished by any suitable means. We have found that satisfactory results can be obtained by introducing a stream of cold inert gas into the hot flowing stream after the desired conversion has taken place. The temperature and quantity of this cooling gas can be controlled to give the desired amount of cooling.

When the stream of finely ground sulfur has been cooled below the melting point and advantageously below about 46° C., the finely ground sulfur particles are separated from the stream of inert gas. The separation can be effected by bag filters, gravity settling in a separation chamber with or without the aid of a cyclone separator or in any other suitable manner. When the sulfur is below a temperature of about 46° C. no substantial agglomeration of sulfur particles will occur during the separation operation. If the separation is effected at a temperature above 46° C., but necessarily below the melting point of the sulfur, the resultant agglomerate can be reduced by screening or other means after it has been further cooled to below about 46° C.

The process of our invention can be performed with the use of conventional equipment. As an illustration of equipment which may be used, and for a more detailed example of our process, the following description is given with reference to the accompanying drawing which is a diagrammatic illustration of a flow diagram of a suitable embodiment of our process.

Finely ground sulfur is introduced into a mixing chamber 1 through line 2 which is provided with a valve 3 to control the rate of flow. By means of a blower 4 recycled inert gas from a separator 23 is passed through line 5 and connecting lines 6 and 7 and is introduced into the mixing chamber 1 in regulated quantity controlled by a valve 8. The finely ground sulfur is entrained in the inert gas and passes out of the mixing chamber 1 through line 9 into a vertical standpipe 10. The inert entraining gas introduced into the mixing chamber 1 in the illustrated embodiment is below the treating temperature of the process, i. e., below a temperature approximating the melting point of the sulfur or higher, so that the stream entering the standpipe 10 must be heated to the treating temperature.

For this heating operation additional inert gas at elevated temperature is introduced into the standpipe 10 through line 11 in desired quantity controlled by valve 12 to effect the required temperature elevation of the resultant stream in the standpipe 10. In the illustrated embodiment this inert gas is produced by a flue gas generator 13 into which fuel and air are introduced in desired quantity. Because the temperature of the flue gas leaving the flue gas generator 13 through line 14 may be at a higher temperature than is desired for introduction into standpipe 10, line 15 is provided to quench the hot generated gas with recycled gas from the separator 23. The amount of recycled gas from line 15 joining the hot generated gas from line 14 is controlled by means of valve 16 to give the desired gas temperature in line 11 for introduction into the standpipe 10.

The gas and sulfur stream from line 9 and the heated gas stream from line 11 merge in the standpipe 10 and flow as a stream at treating temperature through the standpipe 10 where the conversion from caking to non-caking sulfur takes place. The retention time in standpipe 10 will be determined by the height of the standpipe and the velocity of the stream. The standpipe can be designed for the maximum required retention time to be encountered in any application of the process. While this may mean that conversion in some instances will be accomplished before the sulfur has traveled the height of the standpipe, no deleterious effect on the product will result. Holding the sulfur particles at the treating temperature for an excessive period of time is not possible because of the nature of the process, and where the required retention time is only a few seconds up to a minute, holding at treating temperature for even several minutes beyond the required retention time is not harmful to the product.

When the conversion is complete, the stream must be cooled at least below the melting point of the sulfur before the sulfur can be separated from the gas stream. The stream can be cooled to below about 46° C. with the advantage that substantially no agglomeration will occur during the separation operation.

The final temperature of the stream entering the separator 17 from the standpipe 10 is controlled by introducing into the stream in the standpipe 10 an additional stream of cold gas through line 18. This cold gas is provided by passing recycled gas from the separator 23 through a cooler 19 which may be of any conventional type. The recycled gas is forced through the cooler 19 by means of the blower 4, and the quantity of cold gas introduced into the standpipe 10 through line 18 is controlled by means of a valve 20. The stream of inert gas and suspended sulfur particles then passes into the separator 17 where the major portion of the sulfur is separated from the inert gas. Separation can be effected by gravity settling but is performed with advantage with a cyclone separator. The treated sulfur passes out of the bottom of the separator 17 at 21 and the gas passes overhead through line 22 to a second separator 23 where a further separation takes place. The second separator 23 may not be necessary, but where a large amount of sulfur is to be separated, a single separator may pass an appreciable amount of product overhead. The overhead gas from the separator 23 passes out of the separator 23 into line 24 and the treated sulfur passes out of the bottom of the separator at 25.

The overhead gas from separator 23 is recycled through line 24 to the cooler 19, mixing chamber 1 and line 15 by means of the blower 4. Any excess gas can be discharged from the system by means of vent line 26 controlled by a valve 27.

In order to test the non-caking qualities of the finely ground sulfur produced by the process of our present invention, we subjected samples of sulfur to compression tests. The first test comprised placing a 20 gram sample of sulfur in a brass cylinder one inch in diameter and capped on one end. A piston was placed on top of the sulfur sample and a 2,000-gram weight was loaded on the piston. At the end of 30 minutes the sulfur was removed and examined. A second test was used in which samples of sulfur in paper bags were placed between boards, weights were applied to the top board for periods up to 10 days to simulate warehouse storage of bags piled to a height of 8 feet or more. These compression tests show that the treated product has satisfactory non-caking qualities on storage under pressure. In comparison, all untreated sulfur samples caked hard when subjected to either of these tests.

The particles of our non-caking sulfur product are characterized by smoother, less jagged edges in contrast to particles of untreated sulfur of similar source. The transparency of the treated particles is greater than that of the untreated particles.

The non-caking sulfur of our process is particularly useful as an ingredient in blended mixtures, such as mixed insecticides, and where application of such mixtures is to be performed by dusting apparatus, the absence of any tendency to cake is a distinct advantage.

We claim:

1. A process for producing finely ground sulfur of non-caking character which comprises suspending finely ground sulfur in an inert gas stream, maintaining the suspension at a temperature in the approximate range of the melting point of the sulfur to about 135° C. for a period of time sufficient to effect conversion to noncaking finely divided sulfur, cooling the suspension to a temperature below the melting point, and separating the treated sulfur from the gas stream.

2. A process for producing finely ground sulfur of non-caking character which comprises suspending finely ground sulfur in an inert gas stream, introducing a sufficient quantity of hot inert gas to raise the temperature of the resultant suspension to within the approximate range of the melting point of the sulfur to about 135° C., maintaining the suspension in said temperature range for a period of time sufficient to effect conversion to non-caking finely divided sulfur, cooling the suspension to a temperature below the melting point, and separating the treated sulfur from the gas stream.

3. A process for producing finely ground sulfur of non-caking character which comprises suspending finely ground sulfur in an inert gas stream, maintaining the suspension at a temperature in the approximate range of the melting point of the sulfur to about 135° C. for a period of time sufficient to effect conversion to non-caking finely divided sulfur, cooling the suspension to a temperature below about 46° C., and separating the treated sulfur from the gas stream.

4. A process for producing finely ground sulfur of non-caking character which comprises suspending finely ground sulfur in an inert gas stream, introducing a sufficient quantity of hot inert gas to raise the temperature of the resultant suspension to within the approximate range of the melting point of the sulfur to about 135° C., maintaining the suspension in said temperature range for a period of time sufficient to effect conversion to non-caking finely divided sulfur, cooling the suspension to a temperature below about 46° C., and separating the treated sulfur from the gas stream.

RALPH EUGENE MORNINGSTAR.
GEORGE H. WHIPPLE.

REFERENCES CITED

The following references are of record in the file of this patent:

UNITED STATES PATENTS

| Number | Name | Date |
| --- | --- | --- |
| 1,397,099 | Hill | Nov. 15, 1921 |
| 1,718,334 | Crowley | June 25, 1929 |
| 1,859,992 | Seil | May 24, 1932 |